US006935676B2

(12) United States Patent
Plavetich

(10) Patent No.: US 6,935,676 B2
(45) Date of Patent: Aug. 30, 2005

(54) VEHICLE WITH DOOR CAPABLE OF SWINGING HORIZONTALLY

(75) Inventor: Richard Plavetich, Laguna Beach, CA (US)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 2 days.

(21) Appl. No.: 10/747,106

(22) Filed: Dec. 30, 2003

(65) Prior Publication Data

US 2005/0140169 A1 Jun. 30, 2005

(51) Int. Cl.[7] .................................................. B60J 5/04
(52) U.S. Cl. .............................. 296/146.11; 276/146.9; 16/50
(58) Field of Search ...................... 296/146.11, 146.12, 296/146.9; 16/50, 221, 223, 350

(56) References Cited

U.S. PATENT DOCUMENTS 2,138,523 A * 11/1938 Haberstump ........... 296/146.11
2,743,773 A * 5/1956 Weiertz ...................... 160/213
2,993,730 A * 7/1961 Weiertz ................. 296/146.13
3,158,395 A * 11/1964 Smith .................... 296/146.12
4,416,486 A * 11/1983 McNaught et al. .... 296/190.11
4,632,447 A * 12/1986 Nomura et al. ............. 296/153
4,641,881 A * 2/1987 Nomura et al. ............. 296/202
4,650,241 A * 3/1987 Motonami et al. ..... 296/203.03
4,652,043 A * 3/1987 Hurlburt ................ 296/190.11
4,653,799 A * 3/1987 Arai et al. ............. 296/146.12
5,244,247 A * 9/1993 Kuwabara .............. 296/146.12

FOREIGN PATENT DOCUMENTS

| | | | | |
|---|---|---|---|---|
| DE | 3341922 | * | 6/1985 | |
| DE | 29613954 | * | 10/1996 | |
| EP | 428872 | * | 5/1991 | |
| FR | 2699458 | * | 6/1994 | ............ 296/146.11 |
| JP | 60104415 | * | 6/1985 | ............ 296/146.11 |
| JP | 63103729 | * | 5/1988 | ................. 296/202 |
| JP | 06280436 | * | 10/1994 | ............ 296/146.11 |
| JP | 6-79617 | A | 11/1994 | |
| JP | 2004130962 | * | 4/2004 | |

* cited by examiner

*Primary Examiner*—H. Gutman
(74) *Attorney, Agent, or Firm*—Birch, Stewart, Kolasch & Birch, LLP

(57) ABSTRACT

There is provided a vehicle with a door which is capable of swinging horizontally to open and closed via at least two hinges. Two door side hinge mounting parts are out of alignment in the direction of the length of a vehicle body, and at least one of the hinges is comprised of a vehicle body side hinge mounting part, a door side hinge mounting part, and an extension part which connects the vehicle body hinge mounting part and the door side hinge mounting part.

5 Claims, 2 Drawing Sheets

VEHICLE WITH DOOR CAPABLE OF SWINGING HORIZONTALLY

BACKGROUND OF THE INVENTION

1. Field of the Invention

The present invention relates to a vehicle with a door which is capable of swinging horizontally.

2. Description of the Related Art

Conventionally, a door which swings horizontally to open and close is constructed such that two door hinges are mounted between the door and a vehicle body. The front edge of the door, on which the door hinges are mounted, is substantially vertical, so that the rotation centers of the upper and lower hinges correspond to each other. Also, as disclosed in Japanese Laid-Open Utility Model Publication No. 6-79617, there has been proposed a door which is constructed such that a double hinge is mounted on the front edge of the door to increase the angle at which the door can be swung.

However, according to the above described arrangement in which two hinges are provided at upper and lower locations, if a vehicle has a door with such a special shape that the front edge thereof is not vertical, but is shaped like e.g., an arc, the rotation centers of the upper and lower hinges cannot be made to correspond to each other. Further, according to the arrangement disclosed in Japanese Laid-Open Utility Model Publication No. 6-79617, the weight of the door must be supported by a lower part thereof, and hence the hinge needs to be large and heavy.

SUMMARY OF THE INVENTION

It is therefore an object of the present invention to provide a vehicle which is simply constructed, but can considerably increase the degree of freedom in designing a door capable of swinging horizontally.

To attain the above object, there is provided a vehicle having a door capable of swinging horizontally to open and close via at least two hinges, in which door side hinge mounting parts are out of alignment in a direction of a length of a vehicle body, wherein at least one of the hinges comprises a vehicle body side hinge mounting part, a door side hinge mounting part, and an extension part connecting the vehicle body side hinge mounting part and the door side hinge mounting part to each other.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF THE INVENTION

Figure 1:
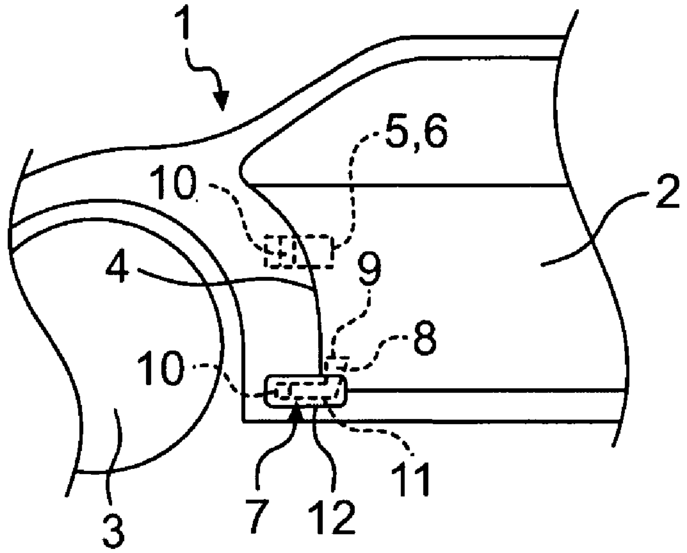
FIG. 1 is a partial side view showing a vehicle with a door capable of swinging horizontally to open and close according to an embodiment of the present invention.
Figure 3:
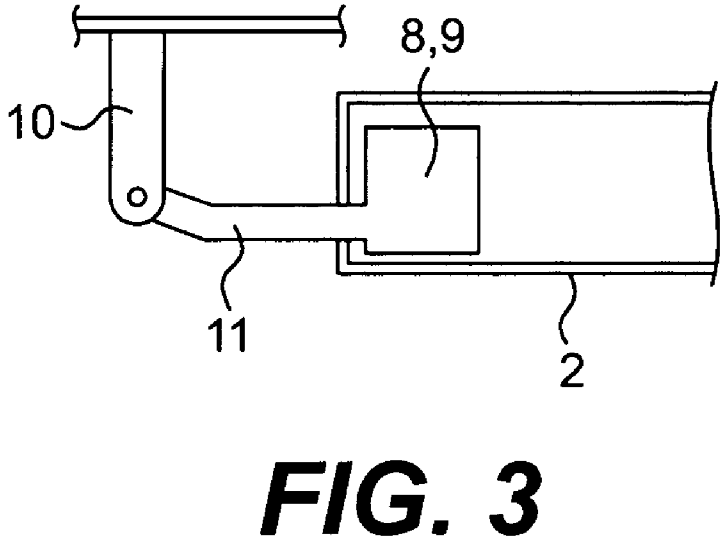
FIG. 3 is a partial plan view showing the lower hinge of the door in FIG. 1.
Figure 2:
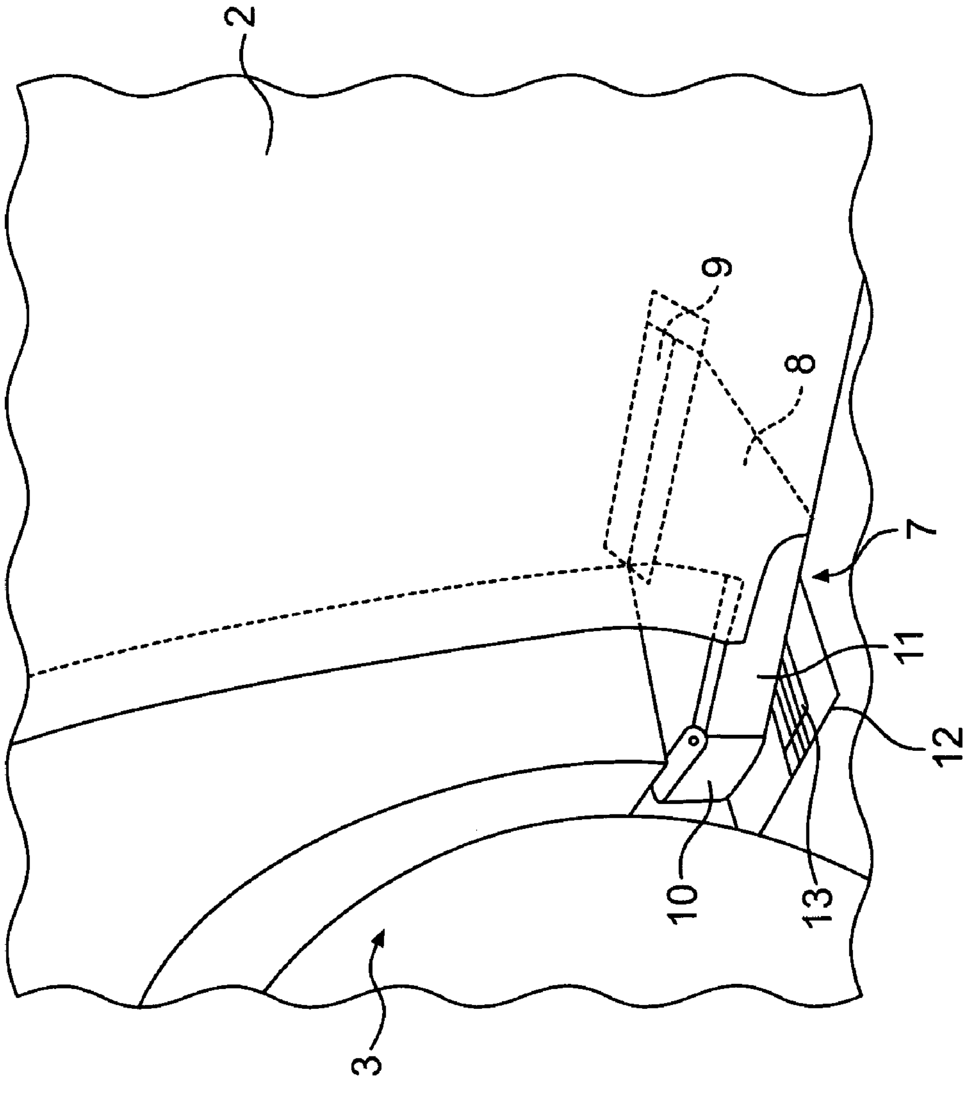
FIG. 2 is a perspective view showing a lower hinge of the door in FIG. 1.

The present invention will now be described in detail with reference to FIGS. 1 to 3 showing an embodiment thereof.

In FIGS. 1 to 3, reference numeral 1 denotes a vehicle; 2, a door (front door); and 3, a wheel (front wheel).

As shown in FIG. 1, the front door 2 of the vehicle 1 is inclined such that a front edge 4 thereof below a side window glass line projects toward the front of a vehicle body, and recedes toward the rear of the vehicle body as it goes downward. An upper hinge mounting part 6, on which an upper hinge 5 is mounted, is provided in an upper part of the front edge 4 of the door 2, while a lower hinge mounting part 8 on which a lower hinge 7 is mounted is provided in a lower part of the front edge 4 of the door 2.

As shown in FIG. 1, the front edge 4 of the door 2 is formed to recede toward the rear of the vehicle body as it goes downward, and hence the upper hinge mounting part 6 and the lower hinge mounting part 8 are significantly out of alignment in the direction of the length of vehicle.

The upper hinge 5 is a gooseneck hinge which is projected and curved toward the inner side of the vehicle body, and prevents interference between the edge of the door 2 and the edge of the vehicle body when the door 2 is opened, and enables the door 2 to be opened at a large angle in such a way that the edge of the door 2 as well as the upper hinge 5 goes around the outer side of the edge of the vehicle body. The upper hinge 5 has one end thereof fixed to part of the vehicle 1 in front of and corresponding to the upper hinge mounting part 6, and has the other end thereof fixed to part of the vehicle 1 in front of and corresponding to the upper hinge mounting part 6, so that the door 2 can be pivotally supported on the vehicle 1 such that it may swing horizontally to open and close. It is to be noted that the upper hinge 5 may not necessarily be the gooseneck hinge as described above, but may be either a single hinge or a double hinge insofar as it enables the door 2 to be opened and closed at a sufficient angle.

As shown in FIGS. 1–3, the lower hinge 7 is comprised of a door side hinge mounting part 9 fixed to the lower hinge mounting part 8 of the door 2, a vehicle body side hinge mounting part 10 fixed to part of the vehicle 1 in front of and corresponding to the lower hinge mounting part 8, and an extension part 11 which is extended from the door side hinge mounting part 9 to be pivotally supported on the vehicle body side mounting part 10. The extension part 11 is pivotally supported on the vehicle body side hinge mounting part 10 at the front of the vehicle so that the rotation centers of the extension part 11 and the upper hinge 5 can correspond to each other. The door 2 is pivotally supported on the vehicle 2 by the upper hinge 5 and the lower hinge 7 such that the door 2 may swing horizontally to open and close.

Further, a cover 12 which covers the extension part 11 of the lower hinge 7 to form a surface substantially flush with the vehicle body with the door 2 being closed as shown in FIG. 1 is provided on the side of the lower part of the vehicle body. In the lower part of the inner side of the vehicle body, the cover 12 is pivotally supported on the vehicle body by a hinge 13 so that the cover 12 can spread out to the outside of the vehicle body. It should be noted that the hinge 13, which pivotally supports the cover 12, is forced in such a direction as to be flush with the outer side of the vehicle body.

When the door 2 is opened, the extension part 11 of the lower hinge 7 pushes the cover 12 to the outside of the vehicle body so that the cover 12 spreads out to the outside of the vehicle body, and hence the extension part 11 never interferes with the vehicle body. When the opened door 2 is closed, the cover 12 which has spread out to the outside of the vehicle body moves in such a direction as to be flush with the external side of the vehicle body, so that the cover 12 can be flush with the outer side of the vehicle body with the door 2 being closed.

Therefore, even in the door 2, which is constructed such that the front edge 4 thereof recedes toward the rear of the vehicle body as it goes downward, and the upper hinge mounting part 6 and the lower hinge mounting part 8 as shown in FIG. 1, are significantly out of alignment, the rotation centers of the upper hinge 5 and the lower hinge 7 can be made to correspond to each other by a simple construction in which the lower hinge 7 is provided with the extension part 11, so that the door 2 can swing horizontally to open and close. Further, the provision of the cover 12, which covers the extension part 11, improves the appearance when the door 2 is closed, and prevents the extension part 11 from interfering with the side of the vehicle body when the door 2 is opened. Further, the provision of the cover 12 considerably increases the degree of freedom in designing the shape of the door 2.

Although in the above-described embodiment, the present invention is applied to the door 2 shaped as illustrated in FIG. 1, the present invention may be applied to doors with various shapes, such as a door whose front edge is inclined to recede toward the rear of a vehicle body as it goes downward. If the present invention is applied to such a door, an upper hinge provided with an extension part as described above is mounted on the front edge of the door, and a cover for the upper hinge is provided so that the door can be swung horizontally to open and close by a simple construction without degrading the appearance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle having a door that swings horizontally, comprising:

a first hinge about which the door swings, said first hinge including a first door side hinge mounting part, a first vehicle body side hinge mounting part, and an extension part connecting said first vehicle body side hinge mounting part and said first door side hinge mounting part; and a second hinge about which the door swings, said second hinge including a second door side hinge mounting part and a second vehicle body side hinge mounting part, the second door side hinge mounting part being out of alignment with respect to the first door side hinge mounting part in a direction of a length of a vehicle body, and the first vehicle body side hinge mounting part and the second vehicle body side hinge mounting part being in alignment in the direction of the vehicle body.

2. A vehicle having a door that swings horizontally, comprising:

a first hinge about which the door swings, said first hinge including a first door side hinge mounting part, a first vehicle body side hinge mounting part, an extension part connecting said first vehicle body side hinge mounting part and said first door side hinge mounting part; and a second hinge about which the door swings and including a second door side hinge mounting part and a second vehicle body side hinge mounting part, the first door side hinge mounting part and the second door side hinge mounting part being out of alignment in a direction of a length of a vehicle body;

wherein the first vehicle body side hinge mounting part and the second vehicle body side hinge mounting part are substantially in alignment with each other in the direction of the length of the vehicle body.

3. A vehicle according to claim 1, further comprising:

a cover that covers said extension part to form a surface substantially flush with the vehicle body when the door is closed.

4. A vehicle according to claim 1, wherein one of said first hinge and said second hinge that enables one of said first door side hinge mounting part and said second door side hinge mounting part and a wheel to be closest to each other in the direction of the length of the vehicle body is a gooseneck hinge.

5. A vehicle according to claim 1, wherein, said first door side hinge mounting part and said second door side hinge mounting part are formed at two locations of a front end of the door, the front end of the door is shaped to recede rearward as the front end extends downward, and said first hinge is provided at a lower of the two locations.

* * * * *